United States Patent [19]

Boyer

[11] 4,111,100

[45] Sep. 5, 1978

[54] NON-ROTATABLE FLUID POWERED NOZZLE AND VALVE COMBINATION

[75] Inventor: Peter W. Boyer, Fort Wayne, Ind.

[73] Assignee: PHD, Inc., Fort Wayne, Ind.

[21] Appl. No.: 774,774

[22] Filed: Mar. 7, 1977

[51] Int. Cl.² .................. F15B 15/22; F01B 19/00
[52] U.S. Cl. ............................. 91/401; 92/108; 92/165 PR; 92/167
[58] Field of Search ............ 91/401; 92/108, 165 PR, 92/167

[56] References Cited

U.S. PATENT DOCUMENTS

| | | | |
|---|---|---|---|
| 2,714,331 | 8/1955 | Plante | 92/165 PR |
| 3,362,211 | 1/1968 | Chirco | 91/401 |
| 3,835,753 | 9/1974 | Bunyard | 92/165 PR |
| 3,896,703 | 7/1975 | Bertanza | 91/401 |

*Primary Examiner*—Paul E. Maslousky
*Attorney, Agent, or Firm*—Gust, Irish, Jeffers & Rickert

[57] ABSTRACT

This invention relates to a non-rotatable fluid powered nozzle and valve combination which includes a cylinder having a piston reciprocally received therein for movement between two reciprocated positions and which defines two separated fluid chambers therewith. A piston rod secured to the piston is slidably received through one end of the cylinder, the cylinder being provided with two ports communicating with said two chambers, respectively. The piston and piston rod conjointly having a longitudinally extending passage therethrough. A hexagonal pin is disposed in one of said chambers and is slidably received in sealing relation by a hexagonal portion of the aforesaid passage. The pin is secured in the other end of the cylinder for limited radial but against longitudinal movement with respect to the cylinder. The pin in sealing relation with a portion of said passage for one position of the piston constitutes a valve which closes or prevents communication between the passage and said one chamber; however, upon movement of said piston in a direction to withdraw the pin from the passage, eventually a position will be reached where a valve opening will be uncovered thereby establishing communication between said one chamber and the passage.

5 Claims, 4 Drawing Figures

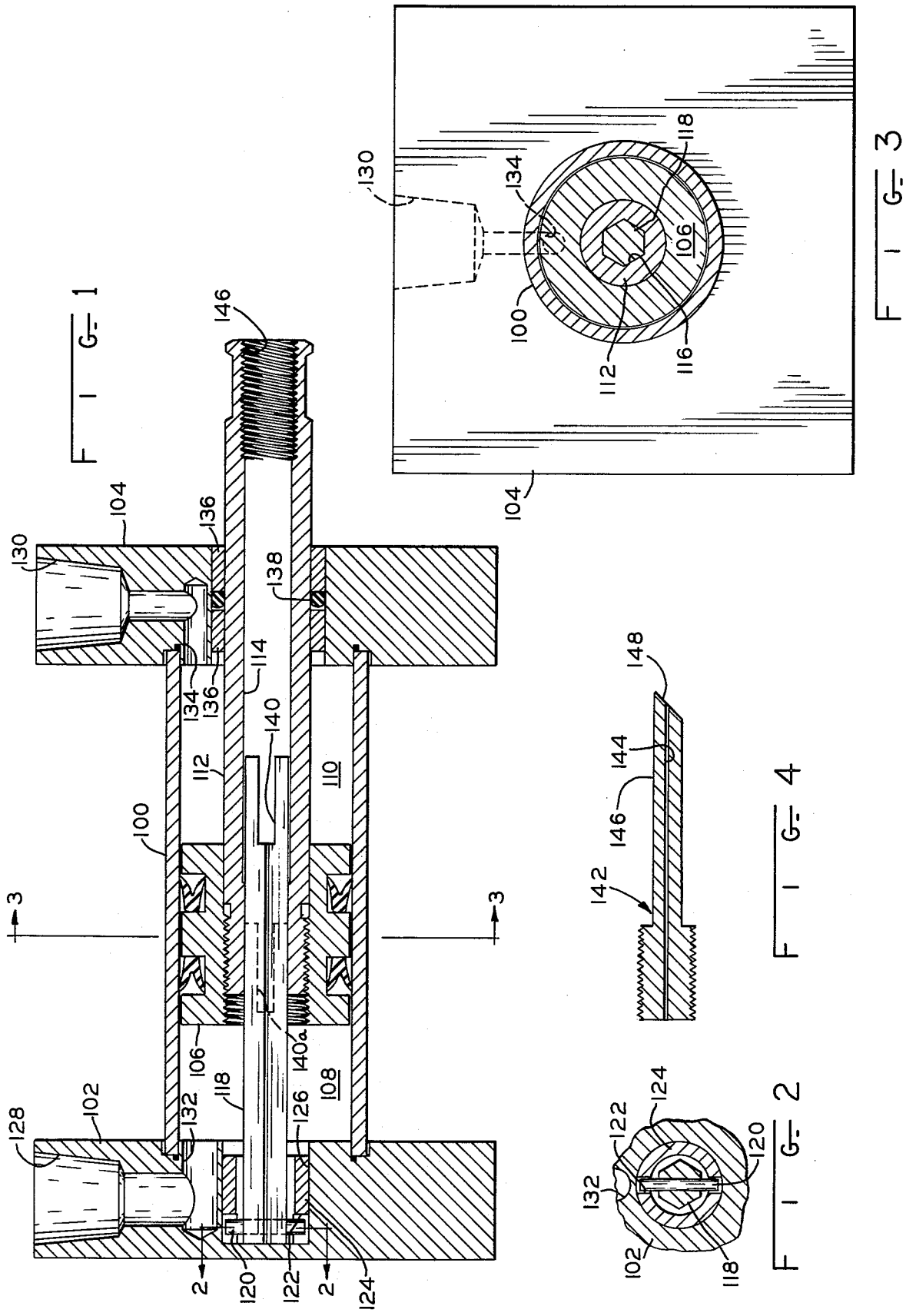

NON-ROTATABLE FLUID POWERED NOZZLE AND VALVE COMBINATION

BACKGROUND OF THE INVENTION

1. Field of the Invention

This invention relates to a fluid powered nozzle and valve combination wherein a nozzle may be projected by a piston under the force of pressure fluid and will be opened to communication with a source of pressure fluid upon being projected predetermined distance, and more particularly to such a combination having a valve pin anchored against longitudinal movement but permitted limited radial movement to align with a central valve passage within a piston.

2. Description of the Prior Art

In one prior art form of a fluid powered nozzle and valve combination, a hollow piston rod projects from opposite ends of the cylinder with the opposite ends of the rod being adapted to be connected to a source of pressure fluid and a punch device, respectively. A valve device mounted externally of the cylinder and operated by a cam on the piston rod serves to control the connection of a source of pressure fluid to the piston rod depending upon the reciprocated position of the latter. A second prior art form of such a fluid powered nozzle utilizes a hollow piston rod which projects from one end only of the cylinder and includes a valve device in the form of a radially adjustable pin received by a passage in the piston and piston rod in sealing relation. For a portion of the piston travel, the sealing engagement with the pin is maintained, but once the piston moves a predetermined distance, this seal is broken thereby establishing communication between one of the cylinder chambers and the passage.

SUMMARY OF THE INVENTION

This invention is a fluid powered device which includes a nozzle and valve operable to connect the nozzle to a source of pressure fluid upon movement of the nozzle to a predetermined position. More particularly, this device includes a cylinder having a piston reciprocably received therein for movement between two reciprocated positions and which defines two separated fluid chambers therewith. A piston rod is secured to the piston and is slidably recieved through one end of the cylinder. Two ports are provided in the cylinder which communicate with the aforesaid two chambers, respectively. The piston and piston rod conjointly have a longitudinally extending passage therethrough, a non-rotatably, spline-like pin located in one of said chambers being slidably received in non-rotatable sealing relation by a portion of said passage. Means mount the pin in the other end of the cylinder for limited radial but against longitudinal movement with respect to the cylinder, said valve means including the pin, and being interposed between said one chamber and said passage which for one reciprocated position of the piston in said cylinder servers communication between said one chamber and said passage and for a second reciprocated position opens communication therebetween. Pressure fluid admitted to said one chamber acts to move the piston from said first to said second positions and flows through said passage when the piston is in the second position by reason of the opening of said valve means. By reason of the limited radial movement of the pin relative to the cylinder, the pin adjusts radially within the passage to compensate for any eccentricities and manufacturing tolerances.

It is an object of this invention to provide a fluid powered device having a non-rotatable nozzle element movable between two positions by means of a piston of a power cylinder and a self-adjustable valve device that controls the connection of said nozzle element with pressure fluid that acts on said piston, said valve device opening the connection for one position of said nozzle element and closing it for the other.

A further object is to provide the fluid powered device of the preceding object which includes a valve pin mounted for limited radial movement in the cylinder to be received by a valve passage in said piston or nozzle element.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

In the drawings, FIG. 1 is a longitudinal sectional view of one embodiment of this invention;

FIG. 2 is a fragmentary sectional view taken substantially along section line 2—2 of FIG. 1;

FIG. 3 is a cross-section taken substantially along section line 3—3 of FIG. 1; and FIG. 4 is a longitudinal sectional view of a piercing nozzle adapted for securement to the distal end of the piston rod of the device of FIG. 1.

DESCRIPTION OF THE PREFERRED EMBODIMENT

Referring to the drawings, and more particularly to FIG. 1, a power cylinder device operated by air under pressure includes a barrel 100 having its ends closed by means of end caps 102 and 104 suitably sealed and secured thereto. A piston 106 is reciprocably received by the barrel 100 and defines therewith two pressure chambers 108 and 110, respectively. A hollow piston rod 112 is coaxially threadedly secured into the central portion of the piston 106 to provide a passageway 114 through the assembly.

As shown more clearly in FIG. 3, the left end portion of the piston rod 112 has the passageway formed in cross section in the form of a hexagon indicated by the numeral 116, this hexagonally shaped portion of the passage being adapted to receive in sealing sliding relation a hexagonally shaped pin 118.

The left-hand end of the valve pin 118 is securely fitted against longitudinal but for limited radial movement to the end cap 102. This is accomplished by means of a retaining element or pin 120 which is press fitted into a radial bore in the left end of the pin 118 such that the ends project from the latter as shown. The ends of the pin 120 are received by a slot 122 formed in the end of a sleeve 124 press fitted into a uniform diameter socket 126 in the end cap 102. The slot or notches 122 in width is slightly larger than the diameter of the pin 120 so as to permit limited transverse movement thereof which would result in corresponding limited radial movement of the pin 118. Also, the length of the pin 120 is somewhat shorter than the diameter of the socket 126 such that the pin 120 may move endwise by a limited amount thereby permitting the valve pin 118 also to move radially by this amount. By reason of this pin 120 clearance, the valve pin 118 may also tilt slightly. Thus, the pin 118 is held against rotational movement relative to the end cap 102 and the barrel 100 but is permitted to move radially by limited amount. The amount of this movement is determined by normal eccentricities encountered in the mass production of parts which form the power cylinder assembly. This will be explained in more detail hereinafter.

Ports 128 and 130 in the end caps 102 and 104, respectively, communicate with bore passages 132 and 134, respectively, that connect with the chambers 108 and 110. By alternately connecting the ports 128 and 130 to air under pressure and exhaust, the piston 106 is caused to reciprocate within the barrel 100.

The piston rod 112 is reciprocally received by a pair of spaced bushings 136 press fitted into a coaxial bore in the end cap 104, an O-ring seal being fitted between the two bushings 136 to sealingly engage the piston rod 112.

An axially extending slot 140 is formed in the right-hand end of the valve pin 118 and extends rearwardly a distance that will provide communication between the chamber 108 and the passage 114 when the piston 106 is protracted ot its rightward extent. This will be explained more fully hereinafter.

An externally threaded (FIG. 6) needle 142, which may for example be of square cross-section, provided with an axially extending air passage 144 is adapted to be threaded into the end 146 of the piston rod 112. The reduced diameter end of the needle 142, indicated by the numeral 146, is cut at an angle of 45° as indicated by the numeral 148. With the needle 142 secured to the piston rod 112, air within the passage 114 will be exhausted through the needle bore 144.

In operation, by admitting air under pressure to the port 130 and connecting the port 128 to atmospheric pressure, the piston 106 will be moved leftwardly until it engages the end cap 102. In this position, the pin 118 will be slidingly engaged with the hexagonally shaped portion 116 of the passage 114 thereby providing a seal between the chamber 108 and the passage 114. A slight leakage due to the metal-to-metal engagement is tolerable. Upon reversing the operations of the ports 128 and 130, that is, applying air under pressure to the port 128 and venting port 130 to atmosphere, the piston 106 will be moved to the right until it engages end cap 104. In this position, the rear end of the slot 140 is positioned just to the left of the hexagonally shaped portion 116 of the passage 114, as shown by the dashed line position of the slot 140 indicated by the numeral 140a, thereby opening communication between the chamber 108 and the passage 114. Air is thus exhausted from the chamber 108 through the passage 114 and nozzle or needle element 142. Now upon admitting air under pressure to chamber 110 via the port 130 and exhausting the chamber 108 by connecting port 128 to atmosphere, the piston 106 will be returned to its leftward position sealing off the chamber 108 from the passage 114.

Since the valve pin 118 can adjust radially by reason of its mounting in the end cap 102, i.e., the fit of the retaining pin 120 into the slot 122, the valve pin 118 is permitted to adjust radially to conform to any eccentricities that may exist between passage portion 116 and the valve pin 118. Thus, throughout the movement of the piston 106, the valve pin 118 is permitted to float radially avoiding any binding that could inhibit the movement of the piston 106 but still retains a seal that substantially inhibits the flow of air from chamber 108 to the passage 114 until the piston 106 is moved toward the right to almost its full stroke.

By reason of the hexagonal shape of the pin 118 and the passage portion 116, the piston 106 and the piston rod 112 are held against rotation relative to the barrel 100. Thus, punches or nozzles 142 other than round may be secured into the end 146 of the piston rod 112 to punch successive holes in thin material of plastic or the like which in every instance are in the same position or orientation relative to the barrel 100. Furthermore, any pieces of material that may become lodged within the nozzle 142 bore are blown therefrom by reason of the passage 114 being opened to the pressure in chamber 108 at the end of the stroke of piston 106. By using an angled end, such as 148, on the nozzle 142, flow of air therefrom deflects transversely with respect to the axis of the passage 144, this being useful in the blowmolding of plastic containers or bottles.

The valve device 118, 140 is provided for exhausting the air captured in the pressure chamber 108 through the hollow piston rod 112 and out of the nozzle end 148 at or near the end of the piston stroke. The valve pin 118 is so arranged as to float radially of the cylinder barrel so as to compensate for any manufacturing eccentricities which might cause any binding engagement between the valve pin and its receiving passage. Thus, reliable reciprocatory movement of the piston and piston rod is possible without any binding or malfunction of the valve that provides for the ejection of a puff of air near or at the end of the piston stroke. Since the valve pin 118 is held against rotation, both the piston 106 and piston rod 112 are likewise held such that the nozzle 142 retains its rotational orientation with respect to cylinder barrel 100.

While there have been described above the principles of this invention in connection with specific apparatus, it is to be clearly understood that this description is made only by way of example and not as a limitation to the scope of the invention.

What is claimed is:

1. A non-rotatable fluid powered nozzle and valve combination comprising a cylinder having a piston reciprocally received therein for movement between two reciprocated positions and which define two separated fluid chambers therewith, a piston rod secured to said piston slidably received through one end of said cylinder, two ports in said cylinder communicating with said two chambers, respectively, said piston and piston rod conjointly having a longitudinally extending passage therethrough, a valve pin in one of said chambers slidably received in sealing relation by a portion of said passage, means mounting said valve pin in the other end of said cylinder for limited radial and tilting movement with respect to said cylinder, said mounting means including a retaining element secured to one end of said pin to project radially therefrom and disposed in a recess which is fixed relative to said cylinder, said recess having a clearance with respect to said element radially of said cylinder, whereby said valve pin is self-aligning with respect to the receiving portion of said passage, valve means including said valve pin interposed between said one chamber and said passage which for one reciprocated position of said piston in said cylinder severs communication between said one chamber and said passage and for a second reciprocated position opens communication therebetween, whereby pressure fluid admitted to said one chamber acts against said piston when the latter is in said first position and flows through said passage when said piston is in said second position, said valve pin and said passage portion in cross-section being complementary and other than circular whereby said piston and piston rod are held against rotation relative to said valve pin; said valve means including an opening in the end portion of said valve pin received by said passage, said opening providing communication between said one chamber and said passage when said piston is in its second position while said valve pin remains engaged with said passage portion, said opening being closed from said one chamber when said piston is in its first position.

2. The combination of claim 1 wherein the opening in said pin end portion is in the form of a radial slot that opens through the pin end.

3. The combination of claim 1 wherein said cylinder includes a uniform diameter barrel and opposite end caps, one of said end caps having said recess disposed therein, said recess having radial portions engaged by complementary portions on said retaining element to limit rotation of said pin relative to said cylinder.

4. The combination of claim 3 wherein said retaining element is in the form of a pin fixedly received to the end portion of said valve pin with end portions of said retaining pin projecting radially beyond said valve pin, said end portions being received by companion notches in said recess, a radial clearance between said end portions and said recess permitting limited radial movement of said pin relative to said cylinder, said notches having a width slightly greater than the transverse dimension of said end portions, said recess further being formed by a uniform diameter cavity in said one end cap and a bushing securely fitted thereinto, said bushing having slots in one end that form said notches.

5. The combination of claim 4 in which said valve pin and the receiving portion of said passage are hexagonally shaped.

* * * * *